(12) United States Patent
Anderson et al.

(10) Patent No.: US 7,254,652 B2
(45) Date of Patent: Aug. 7, 2007

(54) AUTONOMIC CONFIGURATION OF PORT SPEEDS OF COMPONENTS CONNECTED TO AN INTERCONNECTION CABLE

(75) Inventors: Gary Dean Anderson, Austin, TX (US); David Alan Bailey, Kasson, MN (US); Peter Rudolf Keller, Byron, MN (US); Diane Lacey Knipfer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 10/675,678

(22) Filed: Sep. 30, 2003

(65) Prior Publication Data

US 2005/0071514 A1   Mar. 31, 2005

(51) Int. Cl.
G06F 13/00 (2006.01)
G06F 15/177 (2006.01)

(52) U.S. Cl. .............................. 710/29; 710/8; 710/60; 710/100; 710/104; 710/313; 713/1; 713/100

(58) Field of Classification Search ................... 710/2, 710/8, 10, 15, 16, 19, 29, 36, 37, 60, 62–64, 710/72–74, 100, 104; 713/300, 313, 1, 100
See application file for complete search history.

(56) References Cited

U.S. PATENT DOCUMENTS

| | | | |
|---|---|---|---|
| 5,299,944 A | 4/1994 | Larabell et al. | |
| 5,513,326 A * | 4/1996 | Nute | 710/60 |
| 5,649,001 A * | 7/1997 | Thomas et al. | 379/93.07 |
| 5,671,355 A | 9/1997 | Collins | |
| 5,836,785 A | 11/1998 | Lee | |
| 5,909,464 A | 6/1999 | Cohen et al. | |
| 5,938,742 A * | 8/1999 | Faddell et al. | 710/9 |
| 5,978,569 A | 11/1999 | Traeger | |
| 6,032,208 A | 2/2000 | Nixon et al. | |
| 6,115,678 A | 9/2000 | Lieb et al. | |
| 6,226,330 B1 | 5/2001 | Mansur | |
| 6,295,519 B1 | 9/2001 | Wagner et al. | |
| 6,317,805 B1 | 11/2001 | Chilton et al. | |
| 6,368,155 B1 | 4/2002 | Bassler et al. | |
| 6,434,644 B1 | 8/2002 | Young et al. | |
| 2002/0041571 A1* | 4/2002 | Huff | 370/252 |
| 2002/0138604 A1* | 9/2002 | Kopelovitz et al. | 709/223 |

* cited by examiner

*Primary Examiner*—Tanh Q. Nguyen
(74) *Attorney, Agent, or Firm*—James R. Nock (57) ABSTRACT

The present invention provides a method and computer program product for reading an encoded cable speed/length value contained within an interconnection cable to set the interconnection speed of two or more components connected by the interconnection cable within a computing environment. This method detects changes to the cable connections within the I/O fabric of the computing environment, and autonomically reconfigures the connected components to enable the interconnected devices to communicate at the maximum effective bandwidth, based on the length of the interconnection cables utilized.

7 Claims, 7 Drawing Sheets

| HEX | ID0 | ID1 | ID2 | ID3 | COMMENTS |
|---|---|---|---|---|---|
| F | 1 | 1 | 1 | 1 | NO CABLE CONNECTED |
| D | 1 | 1 | 0 | 1 | RIO-G/SCALABILITY CABLE 1.2 M |
| E | 1 | 1 | 1 | 0 | RIO-G/SCALABILITY CABLE .25M |
| C | 1 | 1 | 0 | 0 | RIO-G/SCALABILITY CABLE 3.5M |
| 7 | 0 | 1 | 1 | 1 | RIO-G TO RIO-G CABLE (RESERVED) |
| 6 | 0 | 1 | 1 | 0 | RIO-G TO RIO-G CABLE 8M |
| 5 | 0 | 1 | 0 | 1 | RIO-G TO RIO-G CABLE 10M |
| 4 | 0 | 1 | 0 | 0 | RIO-G TO RIO-G CABLE (RESERVED) |
| B | 1 | 0 | 1 | 1 | RIO-G TO RIO-G CABLE (RESERVED) |
| A | 1 | 0 | 1 | 0 | RIO-G TO RIO-G CABLE (RESERVED) |
| 9 | 1 | 0 | 0 | 1 | RIO-G TO RIO-G CABLE 15M |
| 8 | 1 | 0 | 0 | 0 | RIO-G TO RIO-G CABLE (RESERVED) |
| 3 | 0 | 0 | 1 | 1 | RIO-G TO RIO CABLE 1M HYBRID |
| 2 | 0 | 0 | 1 | 0 | RIO-G TO RIO CABLE 6M HYBRID |
| 1 | 0 | 0 | 0 | 1 | RIO-G TO RIO CABLE 3M HYBRID |
| 0 | 0 | 0 | 0 | 0 | RIO-G TO RIO CABLE 15M |

FIG. 8

AUTONOMIC CONFIGURATION OF PORT SPEEDS OF COMPONENTS CONNECTED TO AN INTERCONNECTION CABLE

FIELD OF THE INVENTION

The present invention generally relates to data processing, and more specifically relates to the autonomic configuration of port speeds of components connected to an interconnection cable in a computing environment.

BACKGROUND OF THE INVENTION

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware ever higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources into different computing environments. The iSeries computer system developed by IBM Corporation is an example of a computer system that supports logical partitioning. If logical partitioning on an iSeries computer system is desired, resource and partition manager code (referred to as a "hypervisor" in iSeries terminology) is installed that allows defining different computing environments on the same platform. Once the resource and partition manager is installed, logical partitions may be created that define different computing environments. The resource and partition manager manages the logical partitions to assure that they can share needed resources in the computer system while maintaining the separate computing environments defined by the logical partitions.

A computer system that includes multiple logical partitions typically shares resources between the logical partitions. For example, a computer system with two logical partitions could be defined that allocates 50% of the CPU to each partition, that allocates 33% of the memory to the first partition and 67% of the memory to the second partition, and that allocates two different input/output (I/O) slots to the two logical partitions, one per partition. Once logical partitions are defined and shared resources are allocated to the logical partitions, each logical partition acts as a separate computer system. Thus in the example above that has a single computer system with two logical partitions, the two logical partitions will appear for all practical purposes to be two separate and distinct computer systems.

As described above, in a logically partitioned computer system, I/O slots can be assigned to individual logical partitions. These I/O slots can be connected to the computing environment through common hardware, or "I/O Fabric", that is effectively shared by all logical partitions having slots connected through that same fabric. In a typical embodiment, I/O slots reside within an I/O enclosure which is physically separate from the processor/memory enclosure of the computing environment. In such an instance, a processor/memory enclosure is connected to the I/O enclosure via a set of interconnection cables. Additional sets of interconnection cables may be used to provide connections among the I/O enclosures themselves.

The interconnection cables forming the I/O fabric can have a variety of lengths, depending upon physical characteristics, proximity and space requirements of the interconnected enclosures. As an example, such interconnection cables typically are available in lengths of 1, 3, 6, 10, 15, and greater than 15 meters. Generally speaking, as the length of the interconnection cable increases, the maximum speed at which data may be transmitted through the cable decreases. By way of example, the shorter cable lengths (e.g., 1, 3, 6 and 10 meters) are operable at data transfer speeds of up to 1 GB/second, an intermediate length cable can only support data transfer speeds of up to 500 MB/second, and a long cable having a length of greater than 15 meters can only support data transfer speeds of up to 250 MB/second.

In order to more easily identify the length of interconnection cables utilized within a computing environment, such cables may incorporate identification pins within the cable connectors which are encoded with identifying information (e.g., speed, length) about the cable itself. Examples of such cables include, U.S. Pat. No. 6,368,155 issued to Bassler et al. on Apr. 9, 2002, entitled "Intelligent Sensing Connectors", and U.S. Pat. No. 5,836,785 issued to Lee on Nov. 17, 1998, entitled "Apparatus and Method to Uniquely Identify Similarly Connected Electrical Devices".

There is a need for a method of reading an encoded cable speed/length value contained within an interconnection cable to set the interconnection speed of two or more devices connected by the cable within a computing environment. This method should be able to detect changes to the cable connections within the I/O fabric of the computing environment, and autonomically reconfigure the connected devices to enable the interconnected devices to communicate at the maximum effective bandwidth, based on the length of the interconnection cables utilized.

SUMMARY OF THE INVENTION

The present invention provides a method and computer program product for reading an encoded cable speed/length value contained within an interconnection cable to set the interconnection speed of two or more components connected by the interconnection cable within a computing environment. This method detects changes to the cable connections within the I/O fabric of the computing environment, and autonomically reconfigures the connected components to enable the interconnected components to communicate at the maximum effective bandwidth, based on the length of the interconnection cables utilized.

In a preferred embodiment, a method is provided for the autonomic configuration of port speeds of components connected to an interconnection cable. The method begins by reading a cable identifier of an interconnection cable connecting components in the computing environment. Next, the method stores the cable identifier of the interconnection cable in a software object within the computing environment. Finally, the method adjusts port speeds of components connected by the interconnection cable based on the cable identifier.

The method may be triggered upon system bring-up, or alternatively, may be triggered during run-time when the interconnection cable becomes active. In a preferred embodiment, the cable identifier contains the length of the associated interconnection cable.

In one embodiment of the present invention, the method step of adjusting port speeds of components connected by the interconnection cable based on the cable identifier further includes the steps of: determining the maximum port speeds of each of the components connected by the interconnection cable; translating the cable length of the associated interconnection cable to a maximum effective transmission speed for the cable; adjusting the port speed of the components to the lowest maximum port speed of the components, if the maximum port speed of any of the components connected to the inter connection cable is less than the maximum effective transmission speed of the cable; and adjusting the port speed of the components to the maximum effective transmission speed of the cable if the maximum port speed of all of the components connected to the interconnection cable is greater than or equal to the maximum effective transmission speed of the cable.

In one embodiment of the present invention, one or more pins on the interconnection cable connector are jumpered to a first voltage supply, and in conjunction with bias resistors on the connected components, create the cable identifier.

The foregoing and other features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
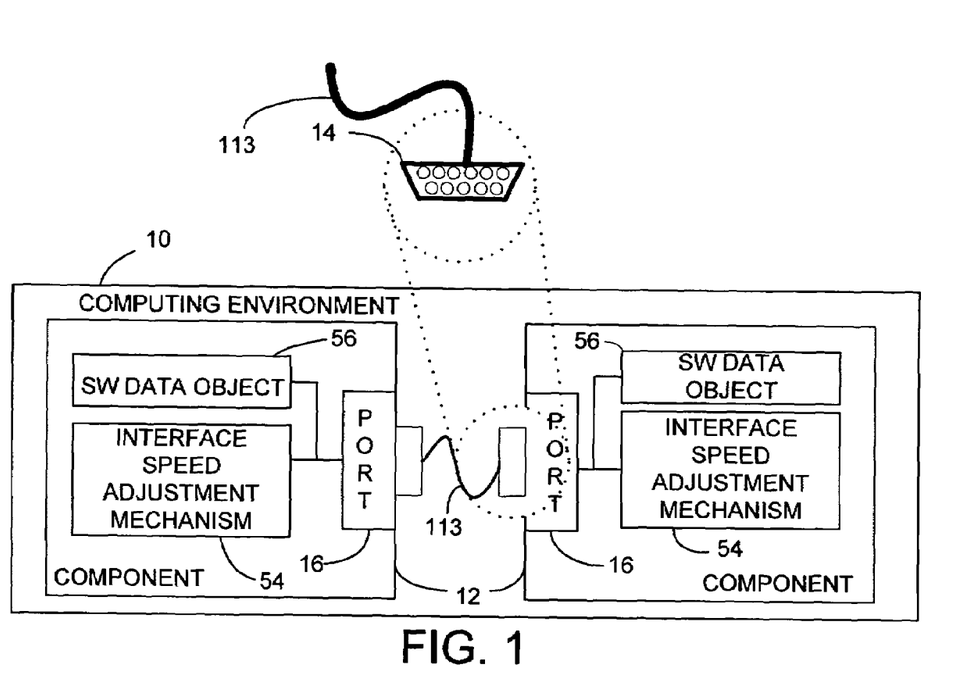
FIG. 1 illustrates a high-level diagram of an exemplary computing environment in which the present invention operates.

FIG. 1 illustrates a high-level diagram of an exemplary computing environment 10 in which the present invention operates. In this computing environment 10, an interconnection cable 113 connects two or more components (e.g., computer servers, device enclosures, etc.) 12 via ports 16. The interconnection cable 113 contains a cable identifier embedded within the cable, the cable identifier providing information on the physical characteristics and/or capabilities of the interconnection cable 113. In a preferred embodiment of the present invention, the cable identifier is provided by previously unused pins in the connector 14 of the interconnection cable, wherein one or more pins on the interconnection cable connector 14 are jumpered to ground, and in conjunction with pull-up resistors on the connected components 12, create the cable identifier. It is contemplated that other mechanisms of incorporating the cable identifier within the interconnection cable may be used, and still remain within the scope and spirit of the present invention. The physical characteristics and capabilities represented by the cable identifier include, but are not limited to: the length of the cable, the speed of the cable, and/or the quality of the cable. An interface speed adjustment mechanism 54 residing within the component 12 reads the cable identifier information from the interconnection cable 113, stores the cable identifier in a software object 56 within component 12, and adjusts the speeds of the ports 16 within the component 12 based on the value of the cable identifier.

Figure 2:
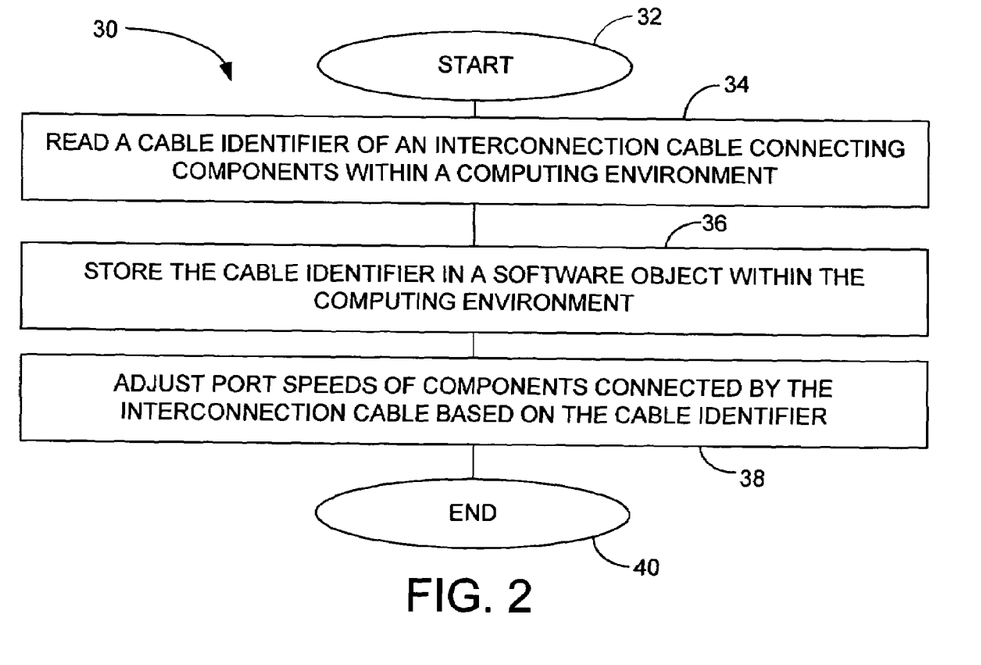
FIG. 2 is a block diagram of a method for the autonomic configuration of port speeds of components connected to an interconnection cable in a computing environment in accordance with the present invention.

FIG. 2 is a block diagram of a method for the autonomic configuration of port speeds of components connected to an interconnection cable in a computing environment 10 in accordance with the present invention, shown generally at 30. The method begins at block 32. At block 34, the method reads a cable identifier of an interconnection cable 113 connecting components 12 within a computing environment 10, as previously described in FIG. 1. Next, as shown at block 36, the cable identifier is stored in a software object 56 within the computing environment. Finally, at block 38, the port speeds of the components 112 connected by the interconnection cable 113 are adjusted, based on the cable identifier. The method ends at block 40.

Figure 3:
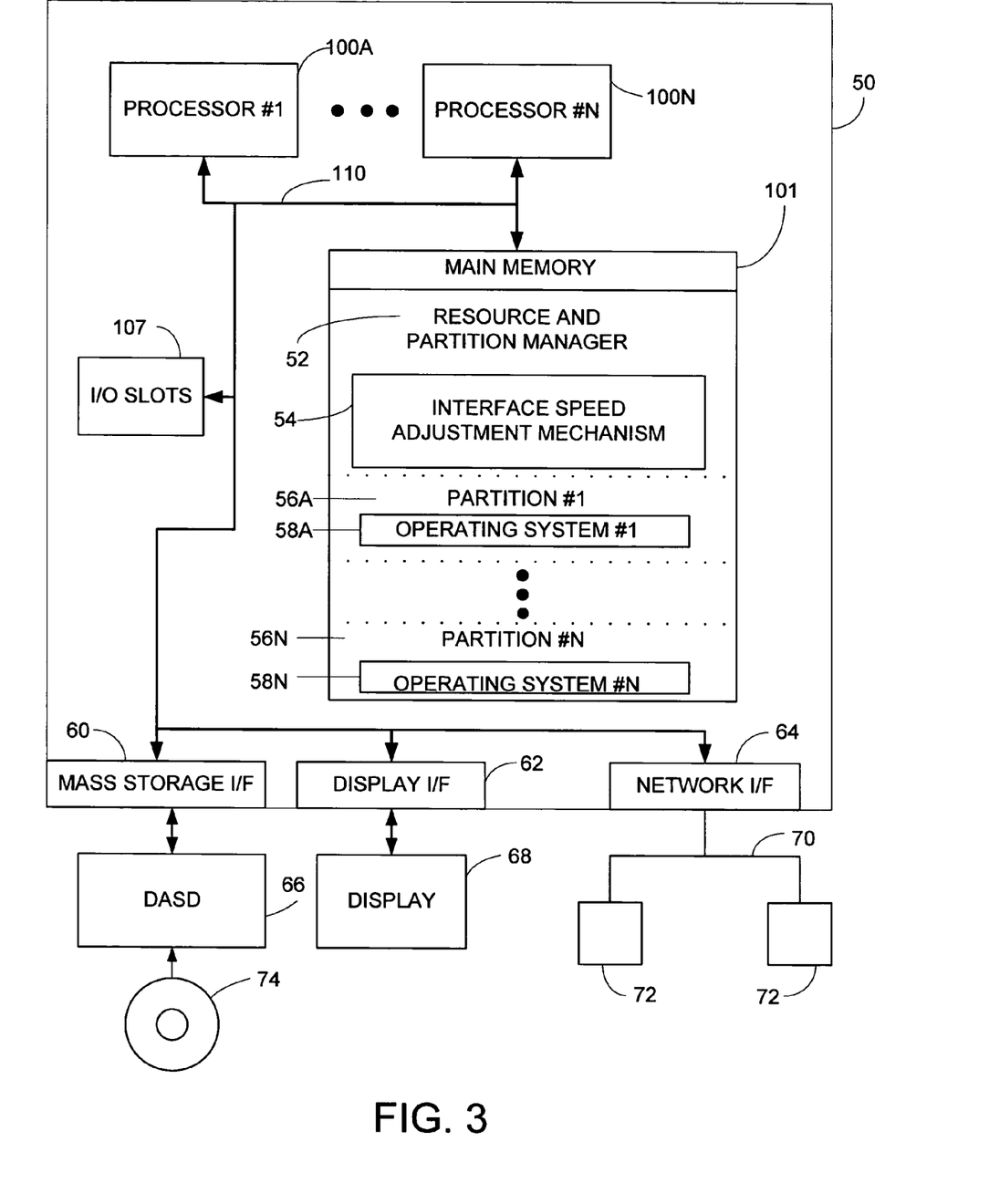
FIG. 3 illustrates a computing environment that supports autonomic adjustment of cable interconnection transfer speeds in accordance with the preferred embodiments.

FIG. 3 illustrates a computer system 50 (e.g., an IBM eServer iSeries computer system) which represents one suitable type of computer system that supports resource allocation and adjustment in accordance with the preferred embodiments of the present invention. Those skilled in the art will appreciate that the mechanisms and apparatus of the present invention apply equally to any computer system, whether or not the computer system supports logical partitioning.

As shown in FIG. 3, computer system 50 comprises one or more processors 100, shown as processors 100A through 100N, coupled to a main memory 101, a mass storage interface 60, a display interface 62, a network interface 64, and a plurality of adapter slots 107. These system components are interconnected through the use of a system bus 110. Mass storage interface 60 is used to connect mass storage devices (such as a direct access storage device 66) to computer system 50. Once specific type of direct access storage device is a CD RW drive, which may read data from a CD RW 74. Note that the mass storage interface 60, display interface 62 and network interface 64 may actually be implemented in adapters coupled to adapter slots 107.

Main memory 101 contains a resource and partition manager 52 (i.e., hypervisor), an interface speed adjustment mechanism 54, and N logical partitions 56, shown in FIG. 1 as logical partitions 56A through 56N. Each logical partition preferably contains a corresponding operating system 58, shown in FIG. 3 as operating systems 58A through 58N.

As described above, interface speed adjustment mechanism 54 reads cable identifier information from an interconnection cable (FIG. 1, element 113) connecting one or more components in the computing environment, stores the cable identifier in a software object 56 within main memory 101, and adjusts the speeds of the ports of each of the interconnected components based on the value of the cable identifier. Interface speed adjustment mechanism 54 performs its port speed adjustment operations based on two triggering events, namely: 1) during computer system bringup (i.e., IPL) and 2) when an interconnection cable is determined to become active.

Operating system 58 is a multitasking operating system, such as OS/400, AIX, or Linux; however, those skilled in the art will appreciate that the spirit and scope of the present invention is not limited to any one operating system. Any suitable operating system can be used. Operating system 58 is a sophisticated program that contains low-level code to manage the resources of computer system 50. Some of these resources are processor 100, main memory 101, mass storage interface 60, display interface 62, network interface 64, system bus 110, and adapter slots 107. The operating system 58 in each partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner, the logical partitions 56 can provide completely different computing environments on the same physical computer system.

The partitions 56A-56N are shown in FIG. 3 to reside within the main memory 101. However, one skilled in the part will recognize that a partition is a logical construct that includes resources other than memory. A logical partition typically specifies a portion of memory, along with an assignment of processor capacity and other systems resources, such as adapter slots 107. Thus, one partition could be defined to include two processors and a portion of memory 101, along with one or more I/O processors that can provide the functions of mass storage interface 60, display interface 62, network interface 64, or interfaces to I/O devices plugged into adapter slots 107. Another partition could then be defined to include three other processors 100, a different portion of memory 101, and one or more I/O processors. The partitions are shown in FIG. 3 to symbolically represent logical partitions, which would include system resources outside of memory 101 within computer system 50. Note also that the resource and partition manager 52 and the interface speed adjustment mechanism 54 preferably reside in memory 101 and hardware separate from the partitions and are facilities and mechanisms that are not directly available to the partitions. In the alternative, interface speed adjustment mechanism 54 could reside in any of the defined partitions of the computer system 50, or even on a computer system 72 coupled to computer system 50 via network 70.

Computer system 50 utilizes well-known virtual addressing mechanisms that allow the programs of computer system 50 to behave as if they have access to a large, single storage entity instead of access to multiple, smaller storage entities such as main memory 101 and DASD device 66. Therefore, while resource and partition manager 52 and the partitions 56A-56N are shown to reside in main memory 101, those skilled in the art will recognize that these items are not necessarily all completely contained in main memory 101 at the same time. It should also be noted that the term "memory" is used herein to generically refer to the entire virtual memory of computer system 50.

Processor 100 may be constructed from one or more microprocessors and/or integrated circuits. Processor 100 executes program instructions stored in main memory 101. Main memory 101 stores programs and data that processor 100 may access. When computer system 50 starts up, processor 100 initially executes the program resources that make up the resource and partition manager 52, which initializes the operating systems 58 in the logical partitions 56.

Although computer system 50 is shown to contain only a single system bus 110, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor(s) 109A-109N, as in iSeries input/output processors, or may be simple industry standard I/O adapters (IOAs).

Display interface 62 is used to directly connect one or more displays 68 to computer system 50. These displays 68, which may non-intelligent (i.e., dumb) terminals or fully programmable workstations, are used to allow system administrators and users to communicate with computer system 50. Note, however, that while display interface 62 is provided to support communication with one or more displays 68, computer system 50 does not necessarily require a display 68 because all needed interaction with users and other processes may occur via network interface 70.

Network interface 64 is used to connect other computer systems 72 and/or workstations to computer system 50 across a network 70. The present invention applies equally no matter how computer system 50 may be connected to other computer systems and/or workstations, regardless of whether the network connection 70 is made using present-day analog and/or digital techniques or via some networking mechanism of the future. In addition, many different network protocols can be used to implement a network. These protocols are specialized computer programs that allow computers to communicate across a network 70. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applied equally regardless of the particular type of computer readable signal bearing media used to actually carry out the distribution. Examples of suitable signal bearing media include: recordable type media such as floppy disks and CD RW, and transmission type media such as digital and analog communications links.

Figure 4:
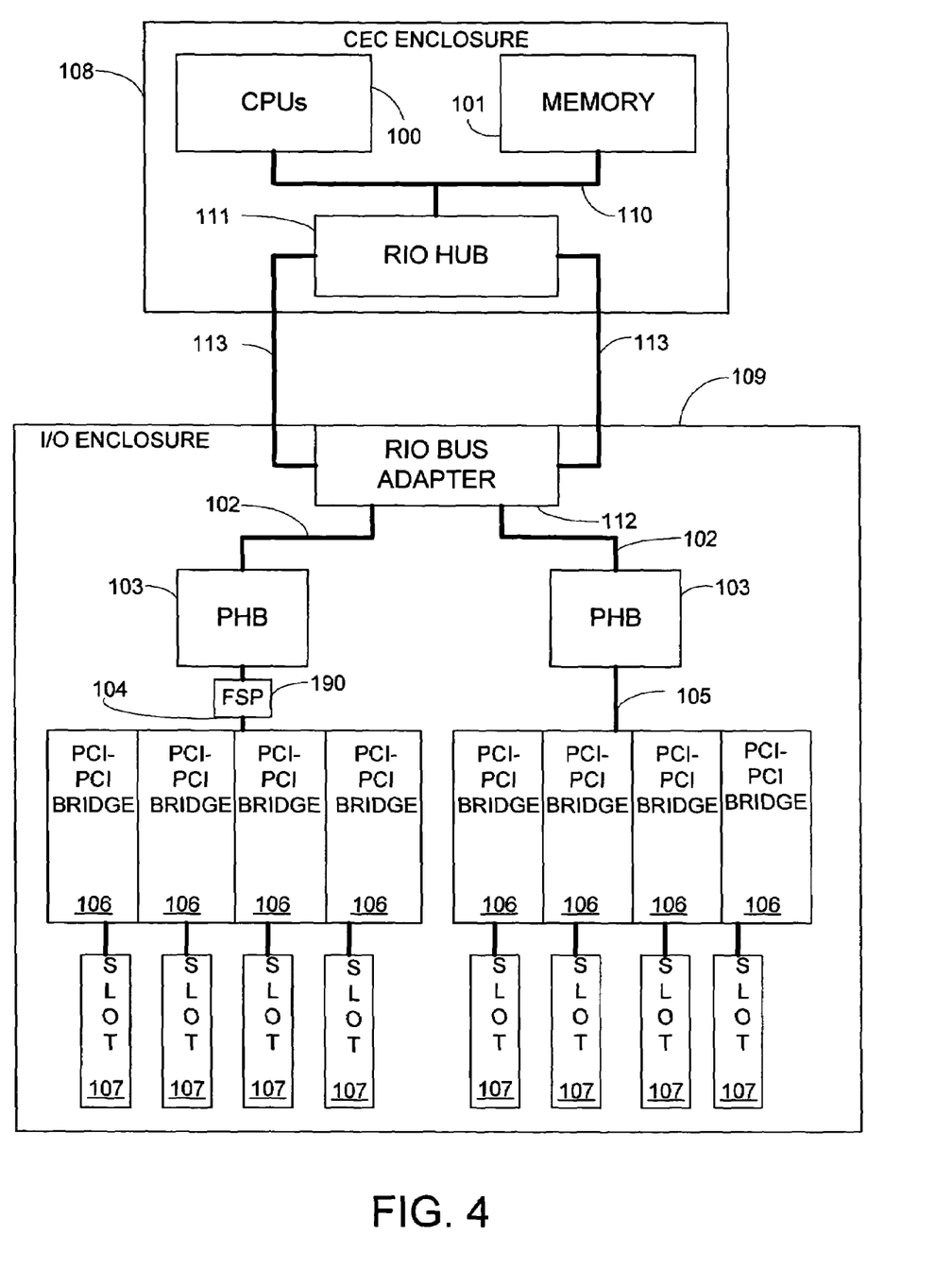
FIG. 4 is a more detailed block diagram showing one specific hardware implementation that may be used in a logically partitioned computer system in accordance with the preferred embodiments.

FIG. 4 illustrates a computing system hardware platform in accordance with the present invention (shown generally at 20), comprising a Central Electronics Complex (CEC) Enclosure 108 an I/O Enclosure 109. CEC Enclosure 108 includes one or more central processing units (CPUs) 100 coupled to memory 101 and a Remote I/O (RIO) hub 111 via system bus 110. Memory 101 includes a resource and partition manager (i.e., hypervisor), an interface speed adjustment mechanism, and one or more logical partitions (as previously shown in FIG. 3). CPUs 100 may be constructed from one or more microprocessors and/or integrated circuits. CPUs 100 execute program instructions stored in memory 101. Memory 101 stores programs and data that CPUs 100 may access.

I/O Enclosure 109 includes a RIO bus adapter 112, coupled to one or more PCI Host Bridges (PHBs) 103 via connector(s) 102. I/O Enclosure 109 further includes a plurality of PCI-PCI bridge elements 106 coupled to the one or more PCI Host Bridges 103 via a primary PCI bus 104. I/O Enclosure further includes a flexible service processor (FSP) 190, which serves to initialize hardware and load the hypervisor. I/O Enclosure 109 also includes a plurality of PCI adapter slots 107 coupled to the plurality of PCI-PCI bridge elements 106 via a secondary PCI bus 105. PCI adapter slots 107 may be either connectors that receive a PCI adapter card (not shown), or PCI adapter chips embedded (soldered) directly on the electronic planar that contains the PCI-PCI Bridge 106 or the PCI Host Bridge 103. Logical partition operating systems "bind" CPU 100 addresses to the PCI adapter memory, for memory-mapped I/O from the CPU 100 to the PCI adapters, to enable the PCI adapter direct memory access (DMA) to/from the PCI adapter memory.

In the illustrated embodiment, the RIO bus adapter 112 of I/O Enclosure 109 is coupled to the RIO hub 111 of CEC Enclosure 108 via a signaling medium (e.g., RIO electronic interconnection cables) 113. In alternative embodiments, some or all of the RIO bus adapters 112 and associated PCI hardware 103, 106, and 107 may be incorporated within CEC Enclosure 108 itself. In this instance, the signaling medium 113 coupling RIO hub 111 and RIO bus adapter 112 is signaling wires embedded within the backplane of CEC Enclosure 108.

Hardware facilities in the RIO hub 111, RIO bus adapter 112, PCI Host Bridges 103 and PCI adapters residing within PCI adapter slots 107 are mapped to memory addresses and are thereby subject to processor load/store instructions using these "memory mapped" IO (MMIO) addresses as operands. The RIO hub 111 detects processor load/store operands mapped to hardware facilities using routing tables. The RIO Hub 112 responds directly to any load/store operand targeting facilities (e.g., registers) within the hub itself. For other memory operands, the RIO hub 111 transforms these load/store operation to RIO signaling protocols directed to a particular RIO bus adapter 112.

The RIO bus adapter 112 in turn either responds directly to operands that target its internal facilities, or forwards these operations to the PCI Host Bridges 103. Similarly, the PCI host bridges 103 respond directly to operands that target its internal facilities or transforms operands targeting PCI configuration, memory, or 10 spaces into PCI bus protocols. Similarly the PCI host bridges 103 detect PCI adapter direct memory access (DMA) operations targeting memory and forwards these operations onto the RIO bus adapter 112, which in turn, transforms these DMA operations into RIO signaling protocols that, at the RIO hub 111, become memory read/write operations. The presence of PCI-PCI bridge elements 106 between the PCI Host Bridges 103 and the PCI adapter slots 107 provides additional signaling and adapter binding isolation between the individual PCI adapters in the adapter slots 107 and the PCI Host Bridges 103, CPUs 100 and memory 101. This additional isolation facilitates assignment of individual PCI adapter slots 107 to different logical partitions, such that these partitions can share the platform hardware connected in common to the PCI bridge elements 106, but the operation of PCI adapter slots 107 assigned to other partitions does not disrupt the operation of an adapter assigned to a particular partition, and the adapter address bindings are enforced so that no partition or adapter can use another partition-adapter binding.

Associated with each PCI adapter slot 107 and contained in either the PCI Host Bridges 103 or PCI-PCI bridge elements 106 is a hot plug controller that applies or removes electrical power to that adapter slot independent of the state of power to other I/O components of the platform, including other adapter slots. In a preferred embodiment of the present invention, the PCI adapter hot-plug controls for each adapter slot 107 are contained within the PCI-PCI bridge element 106 that connects to that slot.

In small systems, it is common that all of the elements of FIG. 4 are contained in a single electronic enclosure and the connections 102, 110 and the PCI busses 104, 105 are internal to this one enclosure (not illustrated). In larger systems, there may be many CPUs and memory cards, and many PCI adapter slots requiring more PCI Host Bridges 103 and PCI-PCI bridge elements 106, so that the electronic packaging technologies require multiple electronic enclosures to contain these many hardware elements. FIG. 4 illustrates a common separation of the platform electronics into one enclosure 108 containing the CPUs 100 and memory 101, and one or more other electronic enclosures 109 containing the PCI I/O hardware elements 103, 106 and 107.

As mentioned previously, the interface speed adjustment mechanism autonomically adjusts port speeds of components connected to the interconnection cable 113 during: 1) computer system bringup (IPL time), and 2) run time when the computer system 50 determines that an interconnection cable 113 has become active. More specifically, during computer system bringup, the flexible service processor (FSP) 190 reads the cable identifier from the interconnection cable 113 via an I2C bus (i.e., a bus which physically consists of 2 active wires and a ground connection (not shown)). The cable identifier is passed to the resource and partition manager 52 (i.e., hypervisor) via a port slot map. Resource and partition manager 52 reads this information out of the port slot map and stores it in a software object within main memory 101. During run time, the resource and partition manager 52 detects that a cable has become active and sends an appropriate message to the FSP 190. The FSP 190 then sends a response message with the cable identifier, which is read by the resource and partition manager 52 (i.e., hypervisor), which, in turn, stores the cable identifier in a software object within main memory 101.

Figure 5:
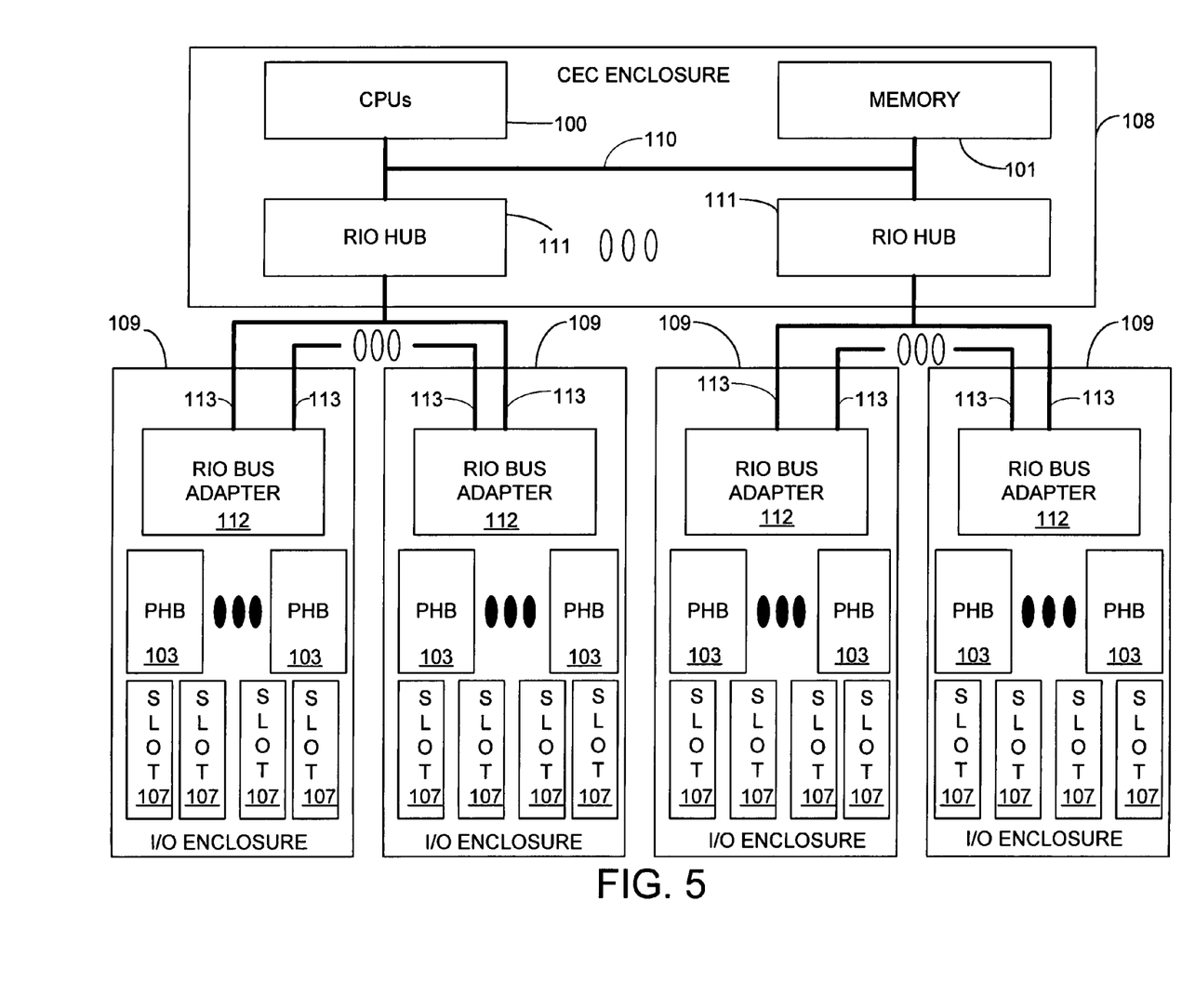
FIG. 5 illustrates a hardware platform configured with multiple I/O enclosures connected to the Central Electronics Complex (CEC) enclosure using Remote I/O.

FIG. 5 illustrates a hardware platform configured with multiple I/O enclosures 109 connected to the CEC enclosure 108 using Remote I/O. Each I/O enclosure 109 is connected to the CEC enclosure 108 or another I/O enclosure 109 using RIO interconnection cables 113 that are interconnected at the RIO hub 111 in a loop topology. The RIO hub 111 and RIO Bus Adapter 112 contain logic to route RIO signals in either direction on the loop, so that if a signaling protocol fails due to an error on one route, the hardware retries the transmission on the alternate route. This provides a redundant network that tolerates the loss of a single connection (e.g., a cable) or failure of one RIO bus adapter 112 in the loop (the hub is always the ultimate source or destination of memory mapped I/O loads and stores, and adapter direct memory accesses, so a failure in the RIO hub 111 is not tolerable in this configuration.

Figure 6:
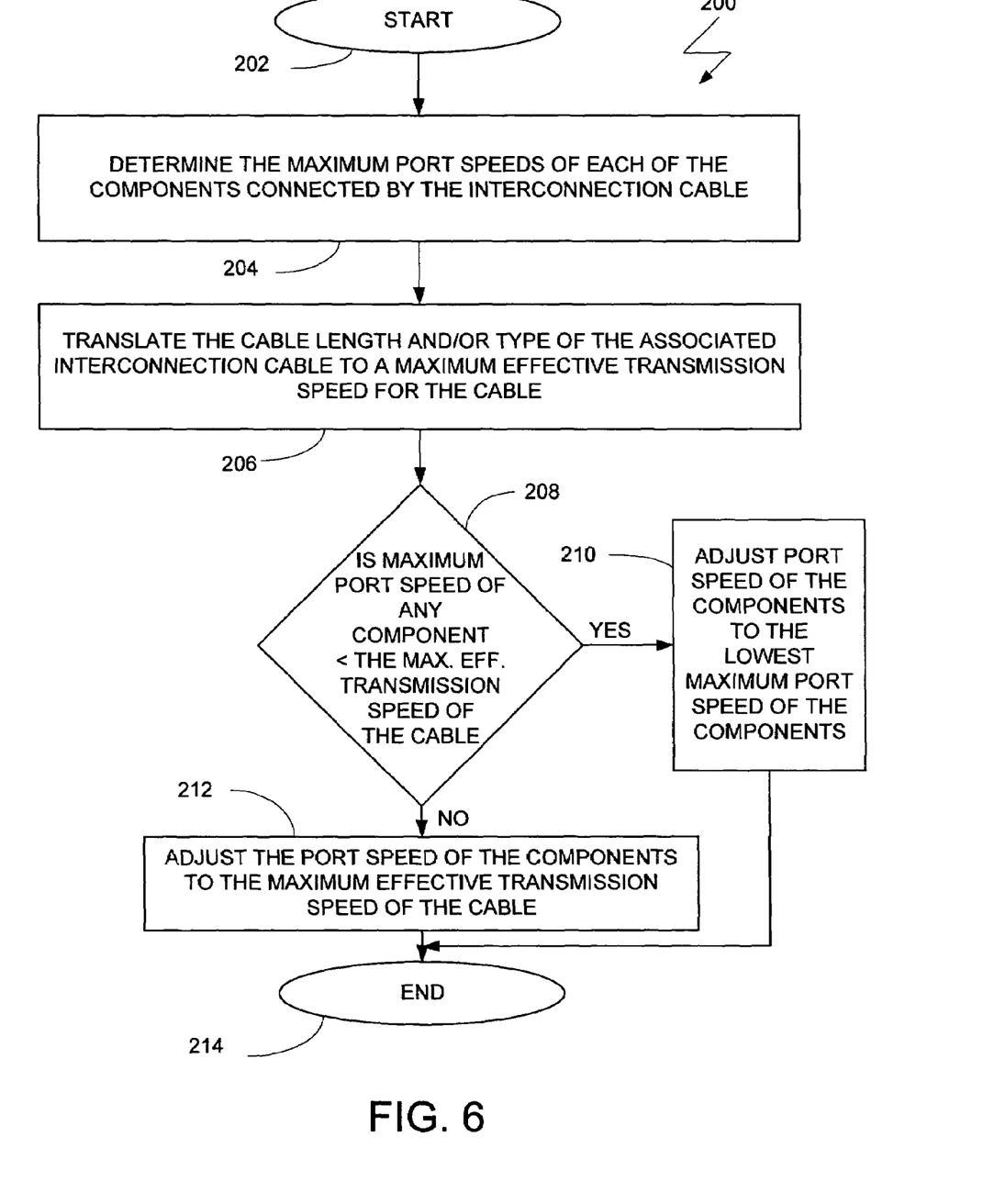
FIG. 6 illustrates a flow diagram for adjusting port speeds of components connected by an interconnection cable based on a cable identifier in accordance with the present invention.

FIG. 6 illustrates a flow diagram for a method of adjusting port speeds of components connected by an interconnection cable based on a cable identifier in accordance with the present invention, shown generally at 200. The method begins at block 202. At block 204, the method begins by determining the maximum port speeds of each of the components connected by the interconnection cable. Next, at block 206, the cable length and/or type of the associated interconnection cable (provided by the cable identifier) is translated to a maximum effective transmission speed for the cable. At block 208, it is determined if the maximum port speed of any of the components connected to the interconnection cable is less than the maximum effective transmission speed of the cable. If so, control passes to block 210, where the port speed of the components is adjusted to the lowest maximum port speed of the interconnected components. If not, control passes to block 212, where the port speed of the components is adjusted to the maximum effective transmission speed of the cable. The method ends at block 214.

Figure 7:
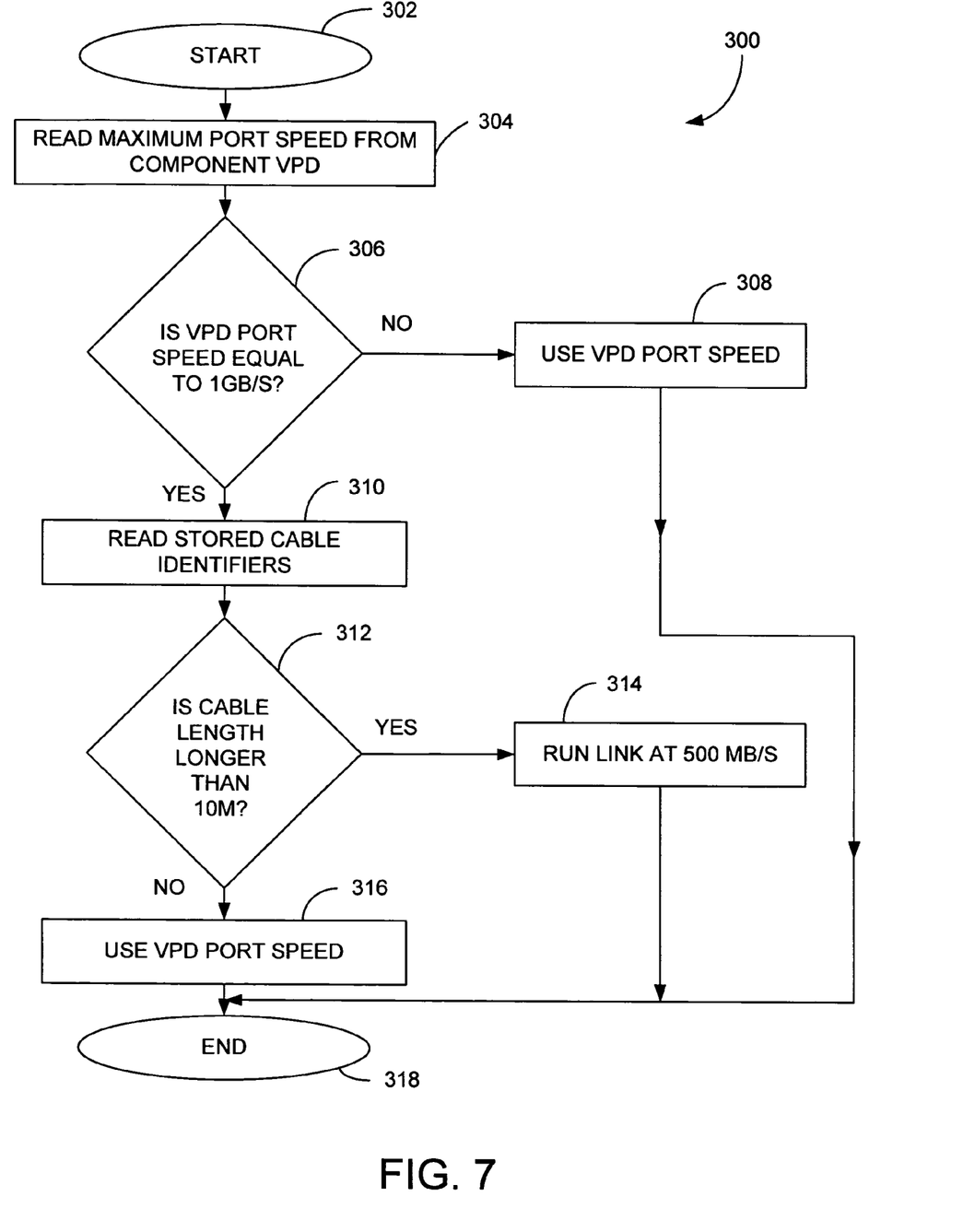
FIG. 7 illustrates a more specific flow diagram of a method of adjusting port speeds of components in a computing environment connected by an interconnection cable, in accordance with the exemplary embodiment previously shown in FIG. 5.

FIG. 7 illustrates a more specific flow diagram of a method 300 of adjusting port speeds of components in a computing environment connected by an interconnection cable, in accordance with the exemplary embodiment shown in FIG. 5. The method begins at block 302. At block 304, the maximum port speed for each of the components connected by the interconnection cable is read from the component's virtual product data (VPD). At block 306, it is determined if the port speed for each of the interconnected components is equal to 1 GB/S. If so, the components used the VPD port speed, as shown at block 308, and the method terminates at block 318. If the port speed from the VPD is not equal to 1 GB/S, the cable identifier information is read from the interconnection cable 113, as shown at block 310. In the illustrated embodiment, the cable identifier provides the length and/or type of the interconnection cable 113. At block 312, it is determined if the interconnection cable length (obtained from the cable identifier) is longer than 10M. If so, the port speed from the port link is set to 500 MB/S (as shown at block 314), and the method terminates at block 318. If the interconnection cable length is not longer than 10M, the port link is set to use the VPD port speed, as shown at block 316. The method then terminates at block 318. This method is provided for illustrative purposes only. It is anticipated that a variety of methods may be used to obtain cable identification information from components, and that the optimal port link speed can be set in a variety of different ways, and still remain within the spirit and scope of the present invention.

Figure 8:
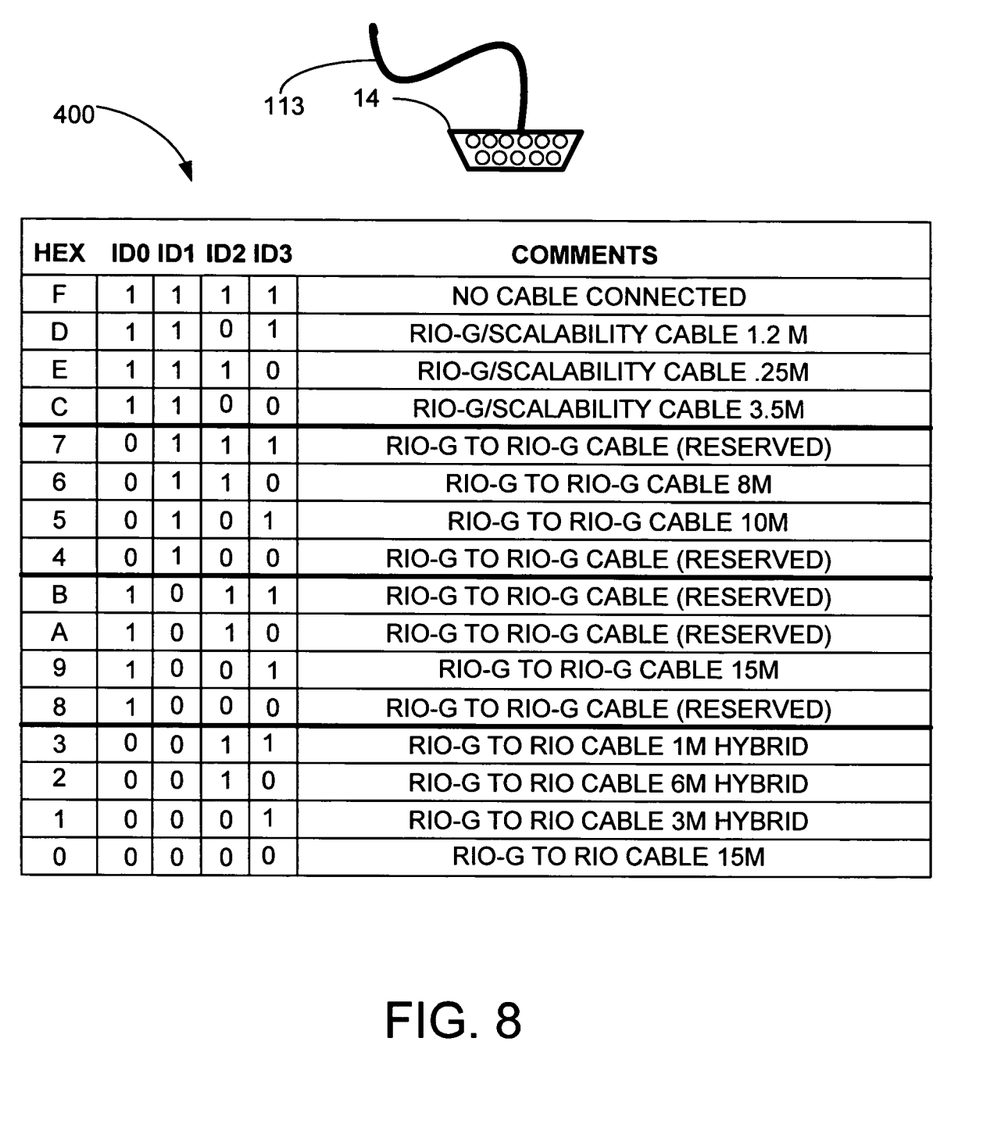
FIG. 8 illustrates an exemplary example of cable identifier bit definitions within an interconnection cable connector in accordance with the present invention.

FIG. 8 illustrates an exemplary example of cable identifier bit definitions within an interconnection cable connector in accordance with the present invention. In the illustrated embodiment, interconnection cable 113 has a connector 14 having a plurality of pins. Some of the pins of connector 14 are used to transmit data back and forth between the interconnected components. However, in the illustrated example, four of the pins in connector 14 are uniquely used to provide a cable identifier. In the broadest sense, these pins are jumpered to a first voltage supply, and, in conjunction with bias resistors, create the cable identifier. More specifically, in an exemplary embodiment, these cable identifier pins on the interconnection cable connector are jumpered to ground, and, in conjunction with pull-up resistors on the connected components, create the cable identifier. In the illustrated example, it is possible to represent 16 different cable identifiers with the four cable identification pins, as shown generally in table 400. It is contemplated that more or less cable identifier pins on the interconnection cable connector may be used to provide a cable identifier, and still remain within the spirit and scope of the present invention.

One skilled in the art will appreciate that many variations are possible within the scope of the present invention. Thus, while the invention has been particularly shown and described with reference to preferred embodiments thereof, it will be understood by those skilled in the art that there and other changes in form and details may be made therein without departing from the spirit and scope of the invention.

What is claimed is:

1. A method for autonomic configuration of port speeds of components in a computing environment, the method comprising:

reading a cable identifier of an interconnection cable connecting the components in the computing environment, wherein the cable identifier contains the length of the interconnection cable;

storing the cable identifier of the interconnection cable in a software object within the computing environment; and autonomically adjusting the port speeds of the components connected by the interconnection cable based on the identifier, comprising steps of:

determining the maximum port speeds of each of the components connected by the interconnection cable;

translating the cable length of the interconnection cable to a maximum effective transmission speed for the interconnection cable;

if the maximum port speed of any of the components connected to the interconnection cable is less than the maximum effective transmission speed of the interconnection cable, adjusting the port speed of each of the components to the lowest maximum port speed of the components; and if the maximum port speed of each of the components connected to the interconnection cable is greater than or equal to the maximum effective transmission speed of the interconnection cable, adjusting the port speed of each of the components to the maximum effective transmission speed of the interconnection cable.

2. The method of claim 1, wherein the method is triggered upon system bring-up.

3. The method of claim 1, wherein the method is triggered during run time when the interconnection cable becomes active.

4. The method of claim 1, wherein the cable identifier contains the type of the interconnection cable.

5. The method of claim 1, wherein one or more pins on a connector of the interconnection cable are jumpered to a first voltage supply and, in conjunction with bias resistors on connected components, create the cable identifier resistors on the connected components, create the cable identifier.

6. The method of claim 1, wherein at least one of the components is a logically partitioned computer system.

7. The method of claim 1, wherein at least one of the components is an I/O enclosure.

* * * * *